Aug. 4, 1964  R. R. POLLOCK  3,142,867
APPARATUS FOR RECAPPING A VEHICULAR TIRE
Filed March 1, 1962  2 Sheets-Sheet 1

INVENTOR.
RANDOLPH R. POLLOCK
BY
ATTORNEYS

Aug. 4, 1964   R. R. POLLOCK   3,142,867
APPARATUS FOR RECAPPING A VEHICULAR TIRE
Filed March 1, 1962   2 Sheets-Sheet 2
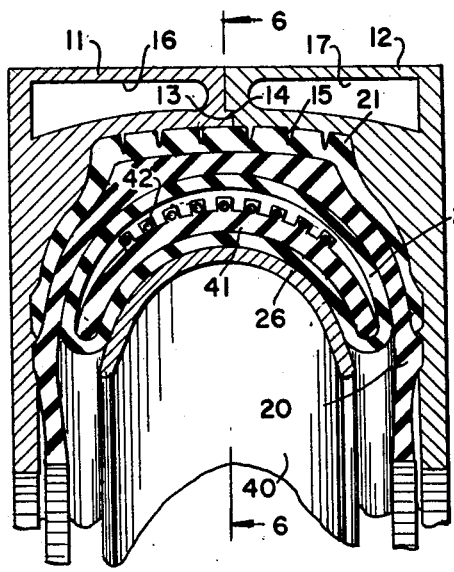
FIG. 5
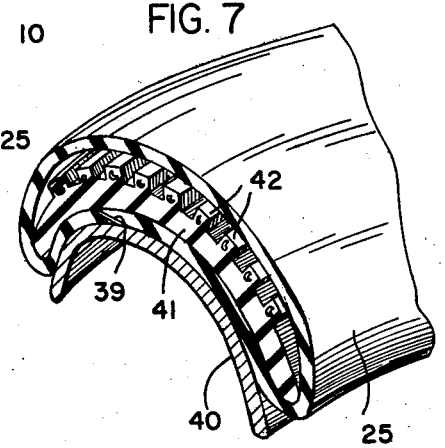
FIG. 7
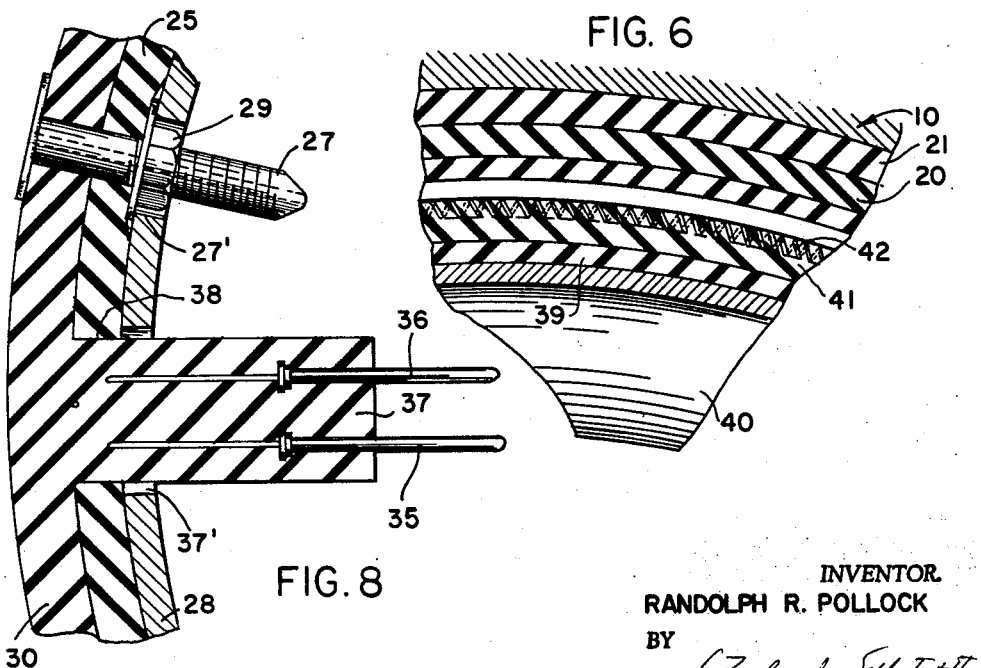
FIG. 6
FIG. 8
INVENTOR.
RANDOLPH R. POLLOCK
BY
ATTORNEYS United States Patent Office 3,142,867
Patented Aug. 4, 1964

3,142,867
APPARATUS FOR RECAPPING A VEHICULAR TIRE
Randolph R. Pollock, 1103 N. Locust Ave., Lawrenceburg, Tenn.
Filed Mar. 1, 1962, Ser. No. 176,604
7 Claims. (Cl. 18—18)

This invention relates to the rebuilding and reconditioning of rubber articles or the like and to apparatus by which such rebuilding is accomplished.

The invention relates particularly to the recapping of vehicular tires or other structures adapted to contain fluid under presure and to apparatus by which said recapping can be accomplished in a more satisfactory manner.

Heretofore various devices have been used to vulcanize a cap on a tire casing by using a matrix including the use of steam as well as electricity as a source of heat. However these devices have been unwieldy, permitted loss of heat and therefore did not cure rapidly, and prolonged heating blistered the internal wall of the casing, overcured the thin wall of the cap causing radial cracking or for many other reasons have proved unsatisfactory.

It is an object of the invention to overcome the prior defects as well as to provide a centralized concentration of heat in a shallow chamber for blocking the heat loss without blistering the internal wall of the tire casing in order to cure the cap being applied, rapidly and efficiently.

Another object of the invention is to provide a heating core within a shallow curing tube which core will heat the air under pressure within such tube to form a heat barrier and prevent the transfer of heat through such tube.

Another object of the invention is to provide a heating core within a curing tube which is flexible and easily manipulated and which will afford supplementary heat to the cap and tire casing being vulcanized.

A further object of the invention is to provide a heating core within a curing tube for use in conjunction with a vaulted rim for rapidly curing a cap on a tire casing without local hot spots, or blistering or overcuring of any portion of either the casing or the cap.

Figure 1:
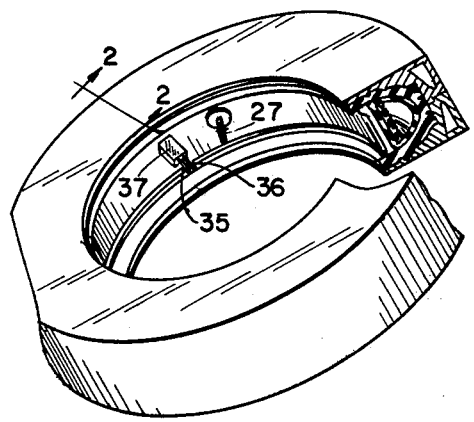
Figure 4:
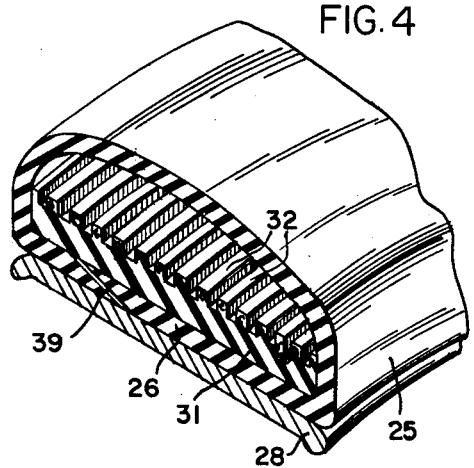
Figure 2:
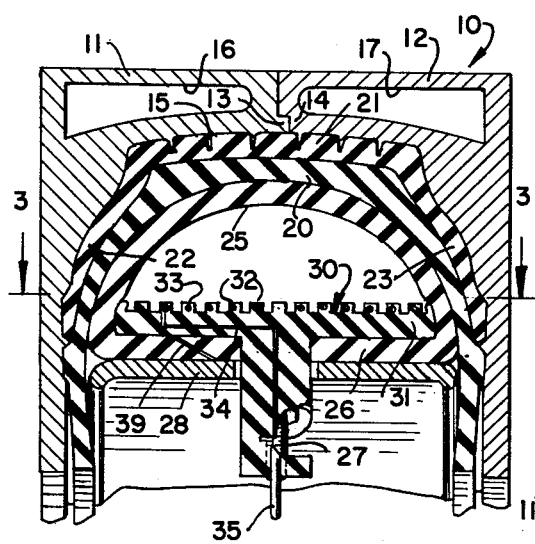
Figure 3:
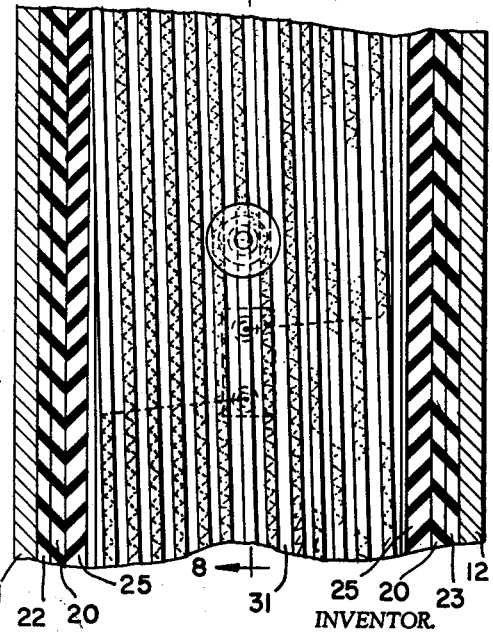

Other objects and advantages of the invention will be apparent from the following description taken in conjunction with the accompanying drawings wherein:

FIG. 1 is a perspective illustrating one application of the invention as applied to a tire casing within a matrix;

FIG. 2, an enlarged section on the line 2—2 of FIG. 1;

FIG. 3, a fragmentary detail section on the line 3—3 of FIG. 2;

FIG. 4, an enlarged perspective of a cross section of the heating core, curing tube and rim of the present invention;

FIG. 5, a vertical detail section of a modified form of the invention;

FIG. 6, a section on the line 6—6 of FIG. 5;

FIG. 7, a perspective similar to FIG. 4 of the modified form of the invention; and FIG. 8, an enlarged fragmentary section on the line 8—8 of FIG. 3.

Briefly stated, the present invention comprises a curing tube and core of flexible material with such tube having a flat or concave surface to reduce the amount of air which can be introduced under pressure thereinto. The core has a plurality of thread-like projections raised from one surface and most of such projections have a helical resistance heating wire therein to heat the air within the tube to provide a barrier to the transfer of heat from the matrix as well as to supply supplemental heat for the vulcanizing process. The curing tube is supported within a tire casing by a flat or vaulted rim and such casing is placed in contact with a rubber cap within a heated matrix to perform the vulcanization.

With continued reference to the drawings, a split mold or matrix 10 is provided comprising portions 11 and 12 adapted to be connected in any conventional manner (not shown). The mold portion 11 has a shoulder 13 for cooperative engagement within a recess 14 in the mold portion 12 for aligning such mold portions when assembled. The mold portions 11 and 12 each are provided with inwardly projecting ribs 15 which form the tread design in the finished tire.

Heat in the form of live steam is adapted to be applied to such mold portion and distributed therethrough by channels or passageways 16 and 17. Although provision is made for steam heat in the drawings, it will be apparent that the supply of heat may be furnished by electrical or other means to perform the vulcanizing operation.

In the recapping of a tire, a tire casing 20 is buffed to remove all traces of the previous tread from the crown portion and to provide a bonding surface. To recap the tire casing, a strip of uncured rubber or camelback cap 21 is applied to the buffed portion of the tire casing, with such cap forming comparatively thin wings 22 and 23 along the upper sides of the tire casing 20. The casing with the cap applied is then placed in one mold portion of the matrix and the matrix is then closed by applying the other mold portion, whereupon heat is introduced into the matrix through passageways 16 and 17 to vulcanize the cap 21 to the tire casing 20.

To form a more substantial bond, a curing tube 25 having a flattened portion 26 is inserted within the tire casing and air under pressure is introduced into the tube 25 through an externally threaded air valve 27 from a source not shown. Upon the introduction of air, the curing tube expands to apply pressure against the interior of the tire casing to seal such casing against the mold portions 11 and 12, and in order to cause the tube to expand only in the direction of the tire casing, an annular rim 28 of metal or other rigid material is placed against the flattened portion 26 to confine all movement of the curing tube outwardly of such rim.

The rim 28 bearing against the curing tube is in heat exchange relationship with the exterior atmosphere and during the normal operation of vulcanization the heat from the matrix radiates through the curing tube and the rim which is in intimate contact therewith, and a portion of such heat is dissipated to the surrounding atmosphere. Due to the loss of heat the amount of time necessary for the vulcanizing process is excessive and since the tube and camelback cap must be subjected to the heat over an extensive period of time in order to cure the thicker portions of the camelback cap, the thin wing portions on each side of the entire casing become overcured and weakened.

In order to prevent or substantially delay the transfer of heat through the curing tube and thereby hasten the vulcanizing process by utilizing most of the available heat from the matrix and retaining such heat within the curing zone of the operation, a flexible core 30 is provided including a base 31 having a plurality of annular thread-like projections 32 extending outwardly therefrom. The majority of the thread-like projections 32 are adapted to contain a helical resistance heating wire 33 embedded in the material thereof. The resistance wires 33 are connected by leads 34 adjacent to the inner periphery of the base 31 to jacks 35 and 36 carried by a plug 37. Such plug passes through and is bonded to an opening 38 in the tube 25 and is received within an opening 37' in the rim 28. Jacks 35 and 36 are received within a conventional female receptacle connected to a source of electrical energy not shown.

When the jacks 35 and 36 are connected to such source of electrical energy, the resistance wires 33 will radiate heat to increase the temperature within the curing tube 25 and provide a barrier or centralized concentration of supplementary heat to substantially deter the transfer of the matrix heat through the curing tube and rim. It will be noted that most of the heat which is transferred from the curing tube to the rim will be generated by the core 30 within the curing tube 25 and substantially all of the heat from the matrix will be confined within the curing zone and utilized to vulcanize the camelback cap to the tire casing.

In order to insert the flexible core 30 within the curing tube 25, the flattened portion 26 of the curing tube is cut so that the core 30 may be inserted therein and thereafter the cut is sealed by an adhesive 29 such as uncured rubber which is then vulcanized to form a permanent bond.

The core 30 is mounted within the curing tube 25 in a manner to form an air-tight joint about the valve 27. This is accomplished by providing a lock nut 29 which threadedly engages the external threads of such valve and squeezes the core and tube together sufficiently to form an air-tight union. The rim 28 has openings or slots 27' and 37' adapted to receive valve 27 and plug 28 respectively and permit such valve and plug to extend inwardly of the rim. It will be noted that the rim 28 and tube 25 are readily separable for ease of handling.

The outermost projections 32 of the core 30 are not provided with heating wires so that there is little danger that the heating wires will come in contact with the curing tube and create local hot spots which cause blistering of the thin side walls of the tire casing 20 or overcuring of the thin wings 22 and 23 of the cap 21.

As illustrated in FIGS. 5, 6 and 7 the flat rim 28 may be replaced by a vaulted or arcuate rim 40 so that the flat portion 26 of the curing tube will assume a concave configuration to thereby reduce the volume of air space within the curing tube. The vaulted rim 40 is substantially concentric with the inside of the casing 20 to present a heated surface close to the outer peripheral wall of the curing tube 25. It is desired that the projections which carry the heating coils or wires do not come into contact with the arcuate portion of the curing tube 25 and for this reason a core 41 is provided having a plurality of thread-like projections 42 in which the heating wire is embedded and such projections are located in the central portion of the core with the outer extremities of such core being devoid of both projections and heating wires. Due to the fact that the air space within the curing tube is greatly reduced, the number of heating coils or wires required is similarly reduced to heat such air space and the heated space is confined within the curing zone of the molding operation.

In the operation of the device, the curing tube is placed within a tire casing and the plug-in jacks 35 and 36 are connected to a source of electrical supply and thereafter air under pressure is introduced into the curing tube to force such tube against the casing of the tire to exert an outward pressure on such casing against the mold portions 11 and 12. Electrical energy is then applied to the heating coil 33 and vulcanizing heat is introduced into the matrix through the passageways 16 and 17. The volume of heat from the passageways is substantially greater than the volume of heat given off by the heating coil and such heating coil provides a centralized concentration of supplementary heat only. The heating core 30 with its supply of supplemental heat provides a barrier to prevent the heat from the passageways 16 and 17 from diffusing through the curing tube 25 and the rim 28 and be dissipated through the atmosphere through heat exchange relationship with such rim.

It will be obvious to those skilled in the art that various changes may be made in the invention without departing from the spirit and scope thereof and therefore the invention is not limited by that which is illustrated in the drawings and described in the specification, but only as indicated in the accompanying claims.

What is claimed is:

1. Apparatus for vulcanizing a cap onto a tire casing comprising a matrix, means in said matrix for applying vulcanizing heat, a continuous hollow curing tube located within the tire casing, said curing tube having a flattened portion, means for introducing air under pressure into said curing tube, an annular rim positioned in engagement with the flattened portion of said tube, a flexible core within said tube, a plurality of annular projections on said core, a resistance heating wire embedded within certain of said projections, means for connecting said resistance wire to a source of electrical energy, whereby said resistance wire will heat the air on the interior of said curing tube to provide a barrier against the diffusion of heat through said rim and to confine the vulcanizing heat from said matrix to the area of the curing zone.

2. Apparatus for vulcanizing a cap onto a tire casing comprising a matrix, means carried by said matrix for applying vulcanizing heat, a continuous hollow curing tube within the tire casing, said curing tube having a flattened portion along its inner periphery, means for introducing air under pressure into said curing tube, an annular tube supporting rim in engagement with the flattened portion of said tube, a flexible core within said hollow tube, means carried by said core for heating the air within said tube, whereby a centralized concentration of supplementary heat is provided to form a barrier against the dissipation of the vulcanizing heat through said rim.

3. The structure of claim 2 in which said rim is concave.

4. Apparatus for use with a matrix in the recapping of a tire and comprising a hollow curing tube, means for introducing air under pressure into said tube, a flexible core within said tube, supplemental heating means embedded within said core, means for connecting said heating means to a source of energy, whereby said tube will apply pressure to the interior of the tire casing being recapped and said heating means will modify the temperature of the air under pressure within the tube to provide a barrier against the diffusion of vulcanizing heat through said tube.

5. The structure of claim 4 including a flattened portion on said curing tube, and an annular rim in engagement with the flattened portion of said tube.

6. The structure of claim 4 including a plurality of annular projections on said core, and said heating means being embedded in said projections.

7. The combination of a mold and a curing tube for recapping a tire, said matrix comprising a pair of interengaging mold members, means in each of said mold members for applying heat for vulcanization, said curing tube being of continuous hollow construction, a flexible core located within said curing tube, a plurality of projections along one side of said core, a resistance heating wire embedded within certain of said projections, means for connecting said resistance wire to a source of electrical energy, whereby vulcanizing heat will be applied through said matrix and a centralized concentration of supplementary heat will be applied by said core to form a barrier against the dissipation of the vulcanizing heat through said tube.

References Cited in the file of this patent

UNITED STATES PATENTS

| | | |
|---|---|---|
| 2,586,526 | Enabnit | Feb. 19, 1952 |
| 2,822,576 | Rowe | Feb. 11, 1958 |
| 2,871,514 | White | Feb. 3, 1959 |
| 2,933,765 | Richardson | Apr. 26, 1960 |